United States Patent [19]
Aldecoa

[11] Patent Number: 5,374,490
[45] Date of Patent: Dec. 20, 1994

[54] RECHARGEABLE BATTERY

[75] Inventor: Julio A. Aldecoa, Santa Cruz, Calif.

[73] Assignee: Portable Energy Products, Inc., Scotts Valley, Calif.

[21] Appl. No.: 63,923

[22] Filed: May 19, 1993

[51] Int. Cl.⁵ .................. H01M 6/48; H01M 2/08; H01M 4/56
[52] U.S. Cl. ..................... 429/152; 429/157; 429/158; 429/175; 429/185; 429/210; 429/225
[58] Field of Search ............... 429/210, 162, 163, 175, 429/153, 152, 225, 157, 158, 156, 185, 128

[56] References Cited

U.S. PATENT DOCUMENTS

| | | | |
|---|---|---|---|
| 3,353,999 | 11/1967 | Osborn | 429/156 X |
| 4,204,036 | 5/1980 | Cohen et al. | 429/158 X |
| 4,579,792 | 4/1986 | Bruder | 429/185 X |
| 4,996,128 | 2/1991 | Aldecoa et al. | |
| 5,264,305 | 11/1993 | Charkey | 429/210 X |

Primary Examiner—John S. Maples
Attorney, Agent, or Firm—Hickman & Beyer

[57] ABSTRACT

A rechargeable battery module is disclosed that is particularly well adapted for use in multi-module battery packs. The module includes top and bottom cover plates. At least a portion of each cover plate is formed from electrically conductive materials so that when the battery module is integrated into a stack, the contacts between adjacent battery units are formed by the cover plates. A positive plate that has a positive surface is placed in electrical contact with a first cover plate. A negative plate having a negative surface is also provided. The negative plate is arranged in electrical contact with the second cover plate. The battery includes a plurality of active paste layers. Each active paste layer is applied to an associated surface. One or more separators are provided to isolate the paste layers. The first and second cover plates are electrically isolated by at least the paste layers and the separator means. The cover plates may be ribbed to provide structural support. The ribbing in the first cover plate is complementary to the ribbing in the second cover plate to facilitate stacking. In another preferred embodiment, the cover plates each have lips that serve as side contacts. The described modules may be arranged multidimensional arrays that form parallel connections between laterally adjacent modules and series connections with longitudinally adjacent modules.

23 Claims, 3 Drawing Sheets

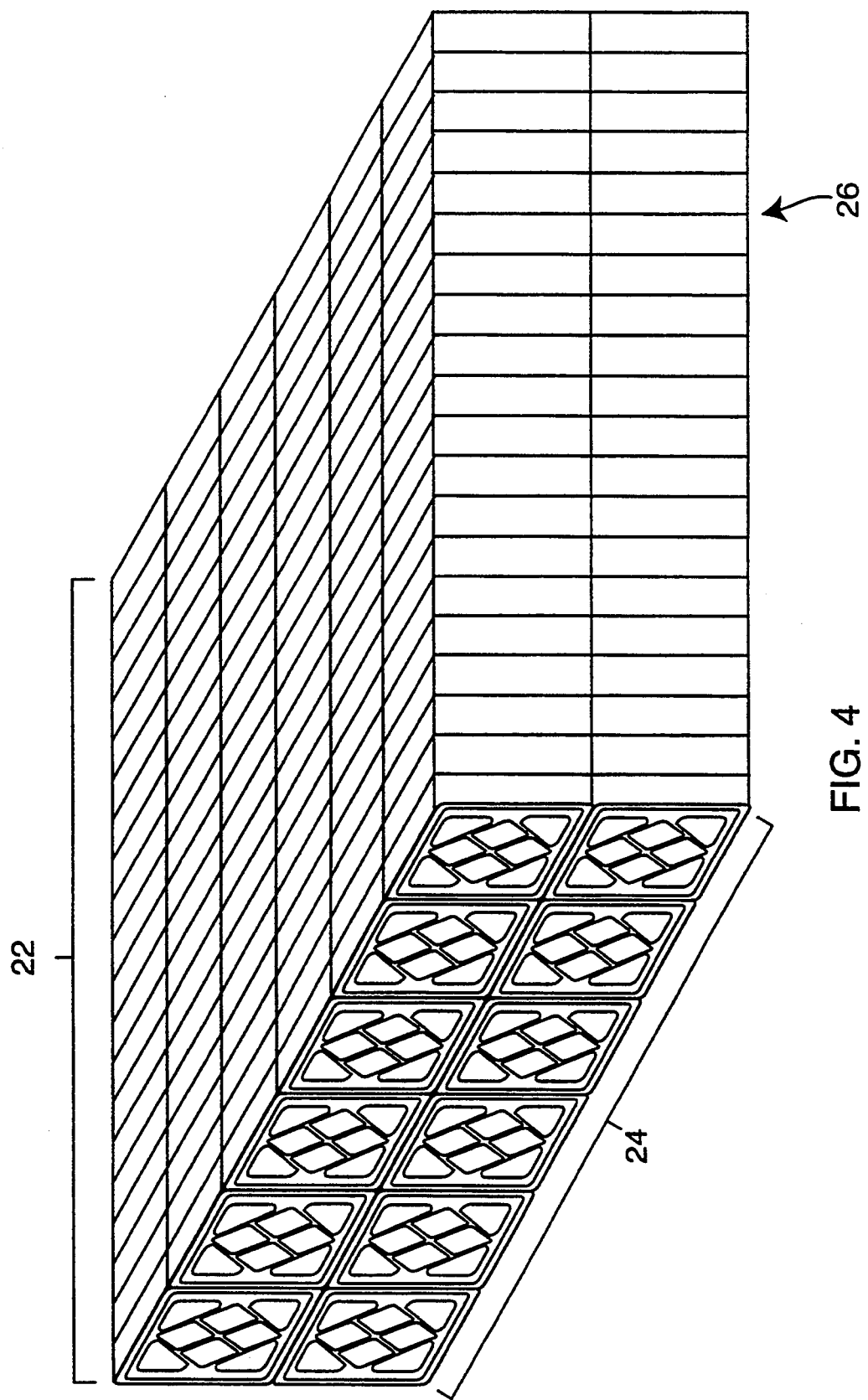

RECHARGEABLE BATTERY

BACKGROUND OF THE INVENTION

The present invention relates generally to rechargeable battery packs. More particularly, a modular battery design is disclosed that is particularly well suited for incorporation into large battery arrays having a multiplicity of battery units that are connected in both series and parallel.

With the increasing public concern over the pollution generated by fossil fuels, there have been extensive efforts to provide electrically powered automobiles. The principle limitation to the implementation of the electrically powered automobile is the lack of a suitable battery to serve as the energy storage device. Specifically, traditional battery designs have the dual drawbacks of being both quite expensive and quite heavy. In recent years, there have been substantial improvements in rechargeable battery technology. However existing battery designs remain quite heavy in comparison with other electrical components. The most common and probably best known battery construction is the lead acid battery. Substantially all of the existing automotive battery designs are lead acid based. One advantage of lead acid batteries is that they have very repeatable power delivery characteristics and may be recharged and overcharged repeatedly with minimal damage to the cells. Additionally, the power curve is consistent enough that the charge remaining in a cell at any given time can be relatively accurately predicted by merely measuring the cell's potential. Thus, a user can be easily warned well in advance of a loss of power. The major drawback of traditional lead acid batteries is that they tend to be heavy, and in order to ensure a reliable electrolytic seal between adjacent cells, it is generally necessary to form a gas tight seal about each cell.

A significant improvement in the traditional lead acid battery design was disclosed in U.S. Pat. No. 4,996,128 which described a recombinant lead acid battery having battery plates that are formed from metallic foils (i.e. lead and lead acid batteries). This arrangement permits the formation of multi-cell batteries. The multi-cell batteries may be incorporate dual function plate or be bipolar in nature to minimize weight. For example, in bipolar embodiments a single plate (foil) acts as a positive plate for one cell and a negative plate for an adjacent cell.

Since the weight characteristics of foil based lead acid batteries are substantially better than conventional lead acid batteries having large lead grids, enterprising individuals have produced very large scale battery arrays which combine large numbers of foil based lead-acid battery packs into a battery array. The array is arranged such that each battery pack unit (which may include a plurality of individual single cell battery packs) is coupled in parallel with a plurality of other battery pack units. These battery pack units that are connected in parallel effectively form a larger cell plane. The cell planes are then connected in series in order to form a battery array.

Although such an arrangement is quite advantageous when compared to the use of conventional lead acid batteries or batteries based on alternative chemistries, the connection between battery packs is relatively complicated. Accordingly, there is need for a lightweight battery construction which is particularly well suited for modular use in battery packs that connect individual units both in parallel with one or more adjacent battery units and in series with a separate group of adjacent battery units.

SUMMARY OF THE INVENTION

To achieve the foregoing and other objects and in accordance with the purpose of the present invention, a rechargeable battery module is disclosed that is particularly well adapted for use in multi-module battery packs. The module includes top and bottom cover plates. At least a portion of each cover plate is formed from electrically conductive materials so that when the battery module is integrated into a stack, the contacts between adjacent battery units are formed by the cover plates. A positive plate that has a positive surface is placed in electrical contact with a first cover plate. A negative plate having a negative surface is also provided. The negative plate is arranged in electrical contact with the second cover plate. The battery includes a plurality of active paste layers. Each active paste layer is applied to an associated surface. One or more separators are provided to isolate the paste layers. The first and second cover plates are electrically isolated by at least the paste layers and the separator means.

In a preferred embodiment, the cover plates are ribbed to provide structural support. The ribbing in the first cover plate is complementary to the ribbing in the second cover plate to facilitate stacking. In another preferred embodiment, the cover plates each have lips that serve as side contacts.

In a preferred use of the modules, a battery pack is provided which includes a plurality of rechargeable battery modules arranged in a layer to form parallel connections between adjacent modules. In this arrangement, the contacts between adjacent battery modules is formed by the cover plate lips. In another preferred use, a plurality of rechargeable battery pack layers are arranged in a stack to form series connections between adjacent battery layers with the contacts between adjacent battery pack layers being formed by the cover plates. Alternatively, a stack of single modules could be provided.

In a preferred multi-cell embodiment of the invention, each module includes at least one dual function plate positioned between the positive and negative plates The dual function plate is formed of foil material and has positive and negative surfaces. Each surface of the dual function plate is coated with an active paste layers. Additionally, seals are provided to seal adjacent plates to form a plurality of independent cells.

In another preferred embodiment, the dual function plate takes the form of a single foil that acts as a bipolar plate. In an alternative embodiment, the dual function plate may take the form of a pair of foils arranged back to back.

BRIEF DESCRIPTION OF THE DRAWINGS

The invention, together with further objects and advantages thereof, may best be understood by reference to the following description taken in conjunction with the accompanying drawings in which:

FIG. 4 is a perspective view of a 20×6×2 module battery array incorporating modules as shown in FIGS. 2 and 3.

DETAILED DESCRIPTION OF THE INVENTION

Figure 1:
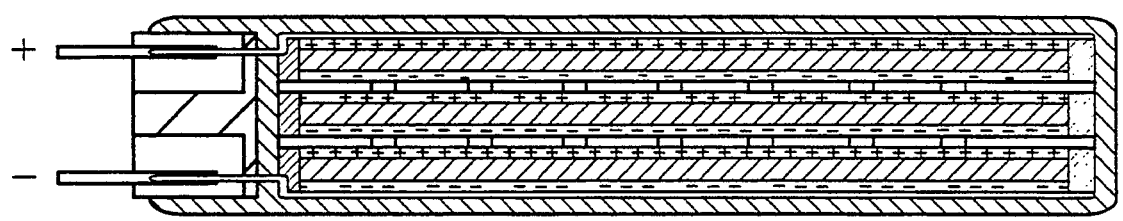
FIG. 1 is a cross-sectional view of a previous foil sheet based bipolar battery unit that was developed by the present inventor.
Figure 2:
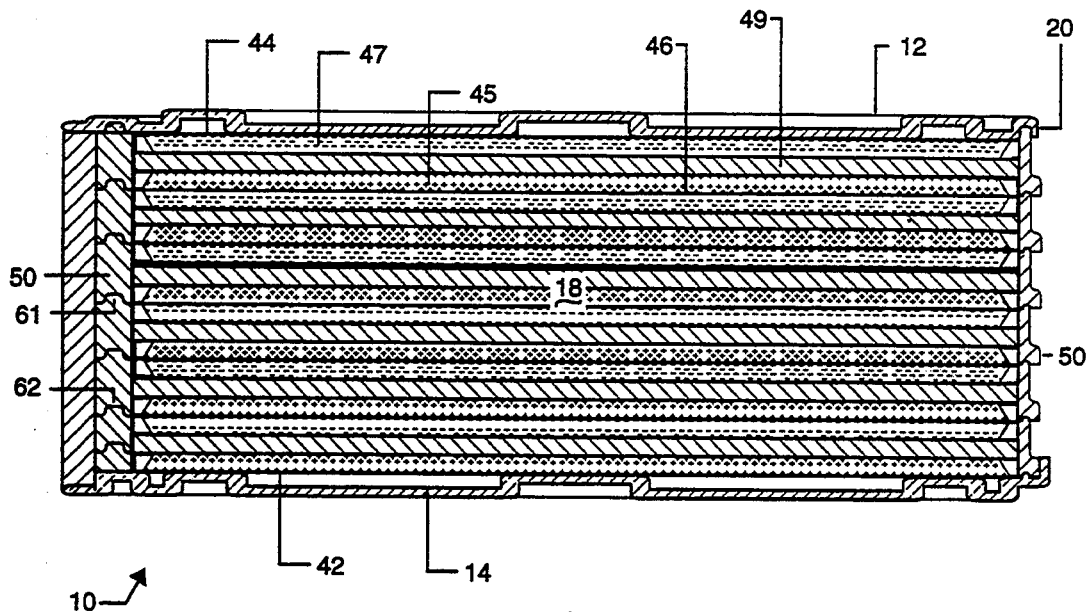
FIG. 2 is a cross-sectional side view of a bipolar battery module in accordance with the present invention.
Figure 3:
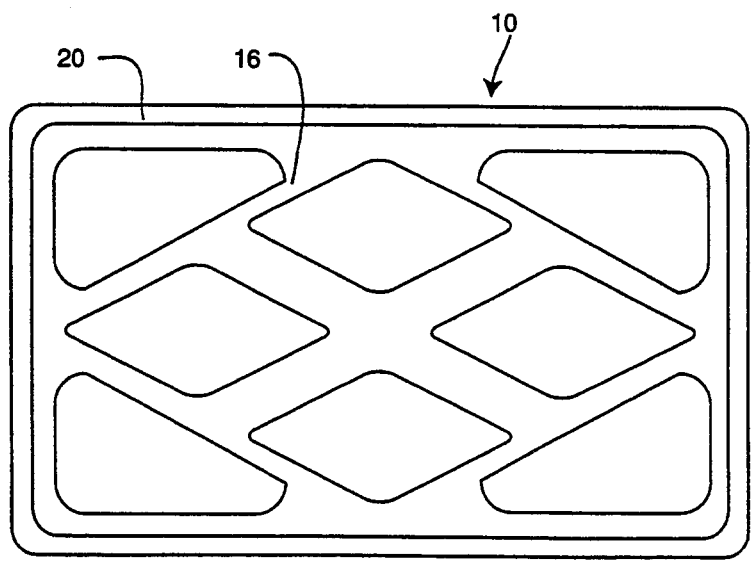
FIG. 3 is a top view of the battery module illustrated in FIG. 2.

As illustrated in the drawings, a preferred embodiment of the invention chosen for the purposes of illustration is a flat recombinant multi-cell foil based lead acid battery module 10. Externally, as best seen in FIGS. 2 and 3, the battery module 10 has upper and lower cover plates 12, 14. The cover plates are preferably made of a conductive light weight material such as aluminum, although a variety of alternative conductive materials could be used as well.

The cover plates are stamped to form complementary ribbed patterns. The ribs 16 are provided to give the plates structural integrity. The complementary patterns is provided so that the battery modules can be placed together in stacks to form multi-module battery packs. Specifically, the top and bottom cover plates are formed from a conductive material so that they can act as the contacts between adjacent modules. That is, one cover plate (plate 12 in FIG. 2) serves as the negative terminal for the battery pack while the other cover plate (plate 14 in FIG. 2) serves as the positive terminal. Since the cover plates are intended to act as opposite terminals, it is important that they be electrically isolated by the battery cells 18. When placed in stacks 22 as seen in FIG. 4, the modules 10 are effectively coupled in series. By coupling the modules in series, a higher potential is created.

The cover plates also include lips 20 which wrap slightly over the sides of the module as best seen in FIG. 2. Depending upon the design goals, these lips can be provided around all four side edges or any selected group of edges. The lips provide both extra structural support and contacts for adjacent modules that are arranged in a layer. In essence, when a plurality of modules are arranged to form a substantially parallel layer 24 as seen in FIG. 4, the modules 10 are effectively coupled in parallel. By coupling the modules in parallel, a higher capacity is provided.

One potential use of the modules is to stack a plurality of battery module layers 24 to form a battery pack 26 that takes the form of a two or three dimensional array. This arrangement has advantages in many applications that require the potential for a high voltage and high capacity. The high voltage is obtained by stacking. The parallel connections insure that even if one of the modules in a layer goes bad, the battery will still function well. The modular construction is also well suited for repair and replacement purposes. When the battery pack is serviced, the modules can be tested in stacks and/or individually. The bad modules can then simply be replaced. By way of example, a suitable method of servicing a battery pack as seen in FIG. 4 is to pull a column (stack) of batteries and test the stack. If the stack is not in good order, then the modules can be tested individually. Any modules that are not up to standard can then be replaced and the stack reassembled and placed back into the array. The described arrangement may prove to be particularly advantageous in high power battery applications such as those that will be required in electric vehicle applications.

In the preferred embodiment described, the battery unit takes the form of a multicell bipolar battery having lead foil plates. Representative foil based multicell and bipolar lead acid batteries are described in applicant's U.S. Pat. No. 4,996,128 which is incorporated herein by reference. Referring again to FIG. 2, the internal components of a suitable bipolar battery will be described. A six cell, twelve volt battery module 10 is constructed having a positive plate 42 in contact with the lower cover plate 14. Thus, the bottom cover plate 14 effectively serves as the positive terminal for the battery module. A negative plate 44 is in direct contact with the upper cover plate 12. Thus, the top cover plate 12 effectively serves as the negative terminal for the battery module. Although direct contact is provided in the described embodiments, it should be understood that a conductive medium could additionally or alternatively be used to electrically connect the positive and negative plates to their respective cover plates.

A plurality of bipolar plates 46 are provided between the positive and negative plates. In the described 12 volt battery, a total of five bipolar plates 46 are provided. However, in alternative embodiments, the number of cells within the battery may be readily changed to provide any desired module potential. The number of bipolar plates 46 required will, of course, depend on the number of cells desired.

The plates 42, 44 and 46 are each pasted with a suitable active material that includes a large amount of lead based compounds and/or free lead to form active paste layers 45, 47. More particularly, the inner surfaces of the positive and negative plates 42, 44 are pasted while both surfaces of the bipolar plates 46 are pasted. Any paste layer that is adjacent a positive plate surface takes the form of a positive paste layer 45 while any paste layer that is adjacent a negative plate surface takes the form of a negative paste layer 47. Paste mixtures typical to conventional recombinant lead acid batteries may be used.

Separators 49 are used to separate adjacent active paste layers. A porous separator material that is capable of absorbing and retaining large amounts of free electrolyte is used in the separators. A suitable separator material is a conventional high porosity microporous fiberglass. One of the important functions of the separators is to maintain a constant spacing between the batter plates. The separators 49 are somewhat resilient. Therefore, when the battery is assembled with the pasted plates, the separators are compressed somewhat. Therefore, the separator exerts a continuous force pushing against the plates to maintain the desired minimum plate spacing.

In the described embodiments, single lead foils are used as the bipolar plates. However, in alternative embodiments, dual plate structures may be used in place of the bipolar plates 46. The dual plate structures include two lead foils placed back-to-back. One of the foils is pasted with a negative active material while the other is pasted with a positive active material. In all other respects the dual plate based multicell battery may be identical to the previously described bipolar battery design.

In any multicell construction, (i.e. in both the bipolar plate and dual plate structures) it is important to insure that the electrolyte material does not leak between adjacent cells. Such leakage could significantly reduce the battery's output. Therefore, the plates are cut so that they have somewhat larger dimensions than the separators 49. Seal members 50 are provided around the periphery of each cell to form a fluid tight seals about each cell. Since the plates take the form of light weight foils, seal rings having mating rims 61 and valleys 62 work well.

The described embodiments have the advantage of having a very simple construction that is ideally suited for modular use. Although only a couple embodiments of the present invention have been described in detail, it should be understood that the present invention may be embodied in many other specific forms without departing from the spirit or scope of the invention. Particularly, the specific construction of the cells may be varied. Further, the cover plate geometries can be varied to suit a particular need. By way of example, the lips 20 can be added or eliminated as needed to provide lateral contacts. The cover plates can include non-conductive portions or a partial non-conductive coating in order to facilitate handling. Although such an arrangement would lessen the total contact surface area, good contacts may still be formed. Therefore, the present examples are to be considered as illustrative and not restrictive, and the invention is not to be limited to the details given herein, but may be modified within the scope of the appended claims.

I claim:

1. A rechargeable battery comprising:
   first and second cover plates at least a portion of which are formed from electrically conductive materials;
   a positive plate formed of foil material, a first surface of the positive plate being in electrical contact with the first cover plate and a second surface of the positive plate forming a positive surface;
   a negative plate formed of foil material, a first surface of the negative plate being in electrical contact with the second cover plate and a second surface of the negative plate forming a negative surface;
   a dual function plate positioned between said positive and negative plates, the dual function plates being formed of foil material and having positive and negative surfaces;
   a plurality of active paste layers, each active paste layer being applied to an associated foil surface;
   a plurality of separators for isolating selected paste layers; and
   sealing means for sealing adjacent plates to form a plurality of independent cells.

2. A rechargeable battery as recited in claim 1, wherein the first and second cover plates are electrically isolated by said plurality of independent cells.

3. A rechargeable battery as recited in claim 2, wherein the cover plates are formed from a metal.

4. A rechargeable battery as recited in claim 2, wherein the cover plates are ribbed to provide structural support.

5. A rechargeable battery as recited in claim 4 wherein the ribbing in the first cover plate is complementary to the ribbing in the second cover plate.

6. A rechargeable battery as recited in claim 1 wherein the first cover plate directly physically contacts the positive plate and the second cover plate directly physically contacts the negative plate.

7. A rechargeable battery as recited in claim 1 wherein the first cover plate contacts the positive plate through a conductive medium and the second cover plate contacts the negative plate through a conductive medium.

8. A battery pack comprising a plurality of rechargeable battery units as recited in claim 5 arranged in a stack to form series connections between adjacent battery units with the contacts between adjacent battery units being formed by the cover plates.

9. A rechargeable battery as recited in claim 1 wherein the cover plates each have lips that serve as side contacts.

10. A plurality of rechargeable battery units as recited in claim 9 wherein the battery units are arranged in a layer to form parallel connections between adjacent battery units with the contacts between adjacent battery units being formed by the cover plate lips.

11. A battery pack comprising a plurality of rechargeable battery layers as recited in claim 10 wherein the battery layers are arranged in a stack to form series connections between adjacent battery layers with the contacts between adjacent battery layers being formed by the cover plates.

12. A rechargeable battery as recited in claim 1 wherein the dual function plate takes the form of a single foil that acts as a bipolar plate.

13. A rechargeable battery as recited in claim 1 wherein the dual function plate takes the form of a pair of foils arranged back to back.

14. A battery module as recited in claim 1 wherein the positive and negative plates are formed from lead foil.

15. A self-contained rechargeable battery module suitable for use in a stack incorporating a plurality of such battery modules to form series connections between adjacent battery modules, the battery module including:
    first and second external casing cover plates, wherein at least a portion of each cover plate is formed from electrically conductive materials such that when the battery module is integrated into a stack, the contacts between adjacent battery modules are formed by the cover plates;
    a positive plate in electrical contact with the first cover plate and having a positive surface;
    a negative plate in electrical contact with the second cover plate and having a negative surface;
    a plurality of active paste layers, each active paste layer being applied to an associated plate surface; and
    separator means for isolating the paste layers; and
    wherein the first and second cover plates are electrically isolated by at least the paste layers and the separator means and cooperate to form opposing sides of a battery casing which encases the battery.

16. A rechargeable battery module as recited in claim 15 wherein the cover plates each have lips that serve as side contacts for coupling the battery module in parallel to adjacent batteries in a battery array.

17. A battery pack comprising a plurality of rechargeable battery modules as recited in claim 16 wherein the battery modules are arranged in a layer to form parallel connections between adjacent battery modules with the contacts between adjacent battery modules being formed by the cover plate lips.

18. A battery pack comprising a plurality of rechargeable battery pack layers as recited in claim 17 wherein the battery pack layers are arranged in a stack to form series connections between adjacent battery layers with the contacts between adjacent battery pack layers being formed by the cover plates.

19. A battery pack comprising a plurality of rechargeable battery modules as recited in claim 15 wherein the battery modules are arranged in a stack to form series connections between adjacent batteries with the contacts between adjacent battery pack layers being formed by the cover plates.

20. A battery module as recited in claim 15 wherein the positive and negative plates are formed from lead foil.

21. A self-contained rechargeable battery module suitable for use in a stack incorporating a plurality of such battery modules to form series connections between adjacent battery modules, the battery module including:

first and second cover plates, wherein the cover plates have a plurality of ribs to provide structural support and at least a portion of each cover plate is formed from electrically conductive materials such that when the battery module is integrated into a stack, the contacts between adjacent battery modules are formed by the cover plates;

a positive plate in electrical contact with the first cover plate and having a positive surface;

a negative plate in electrical contact with the second cover plate and having a negative surface;

a plurality of active paste layers, each active paste layer being applied to an associated plate surface; and separator means for isolating the paste layers; and wherein the first and second cover plates are electrically isolated by at least the paste layers and the separator means and cooperate to form opposing sides of the battery.

22. A rechargeable battery module as recited in claim 21 wherein the ribbing in the first cover plate is complementary to the ribbing in the second cover plate to facilitate stacking.

23. A rechargeable self-contained battery module suitable for use in a stack incorporating a plurality of such battery modules to form series connections between adjacent battery modules, the battery module including:

first and second external cover plates arranged to provide structural support for the battery module, wherein at least a portion of each cover plate is formed from electrically conductive materials such that when the battery module is integrated into a stack, the contacts between adjacent battery modules are formed by the cover plates;

a positive plate formed of foil material, the positive plate being in electrical contact with the first cover plate and having a positive surface;

a negative plate formed of foil material, the negative plate being in electrical contact with the second cover plate and having a negative surface;

a plurality of active paste layers, each active paste layer being applied to an associated plate surface; and separator means for isolating the paste layers; and wherein the first and second cover plates are electrically isolated by at least the paste layers and the separator means and cooperate to form opposing sides of a battery casing which encloses the battery.

* * * * *